(12) United States Patent
Yuan et al.

(10) Patent No.: US 12,088,362 B2
(45) Date of Patent: Sep. 10, 2024

(54) PRECODER INDICATION FOR NON-CODEBOOK-BASED UPLINK TRANSMISSIONS

(71) Applicant: QUALCOMM Incorporated, San Diego, CA (US)

(72) Inventors: Fang Yuan, Beijing (CN); Wooseok Nam, San Diego, CA (US); Mostafa Khoshnevisan, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 133 days.

(21) Appl. No.: 17/907,450

(22) PCT Filed: May 29, 2020

(86) PCT No.: PCT/CN2020/093235
§ 371 (c)(1),
(2) Date: Sep. 27, 2022

(87) PCT Pub. No.: WO2021/237666
PCT Pub. Date: Dec. 2, 2021

(65) Prior Publication Data
US 2023/0132207 A1     Apr. 27, 2023

(51) Int. Cl.
*H04B 7/0404* (2017.01)
*H04B 7/06* (2006.01)
*H04L 5/00* (2006.01)

(52) U.S. Cl.
CPC ......... *H04B 7/0404* (2013.01); *H04B 7/0695* (2013.01); *H04L 5/0048* (2013.01); *H04L 5/0053* (2013.01)

(58) Field of Classification Search
CPC .. H04B 7/0404; H04B 7/0695; H04B 7/0634; H04L 5/0048; H04L 5/0053; H04L 5/0025; H04L 5/0051; H04L 5/0094
See application file for complete search history.

(56) References Cited

U.S. PATENT DOCUMENTS

| | | | |
|---|---|---|---|
| 2019/0319739 A1 | 10/2019 | Kang et al. | |
| 2021/0144808 A1* | 5/2021 | Zhang | H04W 88/06 |
| 2023/0155765 A1* | 5/2023 | Zhang | H04L 5/0012 370/329 |

FOREIGN PATENT DOCUMENTS

| | | |
|---|---|---|
| CN | 109217881 A | 1/2019 |
| WO | 2019190236 A1 | 10/2019 |

OTHER PUBLICATIONS

Intel Corporation: "Remaining Issues on Non-Codebook Based UL Transmission", 3GPP TSG RAN WG1 Meeting 91, Reno, USA, Nov. 27-Dec. 1, 2017, R1-1720067, Dec. 1, 2017 (Dec. 1, 2017) Sections 1-3, pp. 1-5.

(Continued)

*Primary Examiner* — Jean B Corrielus
(74) *Attorney, Agent, or Firm* — Harrity & Harrity, LLP

(57) ABSTRACT

Various aspects of the present disclosure generally relate to wireless communication. In some aspects, a user equipment (UE) may receive, from a base station, downlink control information that indicates a single precoder indication associated with non-codebook usage. The UE may transmit, to the base station, a single antenna-panel uplink transmission or a multiple antenna-panel uplink transmission based at least in part on a determination of whether the single precoder indication indicates the single antenna-panel uplink transmission or the multiple antenna-panel uplink transmission. Numerous other aspects are provided.

30 Claims, 10 Drawing Sheets

(56) References Cited

OTHER PUBLICATIONS

International Search Report and Written Opinion—PCT/CN2020/093235—ISA/EPO—Feb. 25, 2021.
Nokia, et al., "Enhancements on Multi-Beam Operation", 3GPP TSG RAN WG1 Meeting #95, R1-1813490, Spokane, USA, Nov. 12-16, 2018, Nov. 16, 2018 (Nov. 16, 2018) Sections 1-3, 15 Pages.
ZTE: "Further Details on Multi-Beam/TRP Operation", 3GPP Draft, 3GPP TSG RAN WG1 Meeting #99, R1-1911933, 3rd Generation Partnership Project (3GPP), Mobile Competence Centre, 650, Route Des Lucioles, F-06921 Sophia-Antipolis Cedex, France, vol. RAN WG1, No. Reno. US, Nov. 18, 2019-Nov. 22, 2019 Nov. 9, 2019 (Nov. 9, 2019), XP051823114, 10 Pages, 2.3.2 Panel-Specific UL Power Control.
Huawei, et al., "Non-Codebook Based Transmission for UL MIMO", 3GPP TSG RAN WG1 Meeting #90, R1-1712229, 3rd Generation Partnership Project, Mobile Competence Centre, 650, Route Des Lucioles, F-06921 Sophia-Antipolis Cedex, France vol. RAN WG1, No. Prague, Czech Republic, Aug. 21, 2017-Aug. 25, 2017, pp. 1-8, Aug. 20, 2017, XP051315046, Aug. 25, 2017, Sections 2, 3, figures 1-3.
Supplementary European Search Report—EP20937465—Search Authority—The Hague—Feb. 23, 2024.

\* cited by examiner

PRECODER INDICATION FOR NON-CODEBOOK-BASED UPLINK TRANSMISSIONS

CROSS-REFERENCE TO RELATED APPLICATION

This Patent Application is a 371 national stage of PCT Application No. PCT/CN2020/093235 filed on May 29, 2020, entitled "PRECODER INDICATION FOR NON-CODEBOOK-BASED UPLINK TRANSMISSIONS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for precoder indication for non-codebook-based uplink transmissions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include receiving, from a base station, downlink control information (DCI) that indicates a single precoder indication associated with non-codebook usage; and transmitting, to the base station, a single antenna-panel uplink transmission or a multiple antenna-panel uplink transmission based at least in part on a determination of whether the single precoder indication indicates the single antenna-panel uplink transmission or the multiple antenna-panel uplink transmission.

In some aspects, a method of wireless communication, performed by a base station, may include transmitting, to a UE, DCI that indicates a single precoder indication associated with non-codebook usage; and receiving, from the UE, a single antenna-panel uplink transmission or a multiple antenna-panel uplink transmission based at least in part on whether the single precoder indication indicates the single antenna-panel uplink transmission or the multiple antenna-panel uplink transmission.

In some aspects, a non-transitory computer-readable medium may store one or more instructions for wireless communication. The one or more instructions, when executed by one or more processors of a UE, may cause the one or more processors to receive, from a base station, DCI that indicates a single precoder indication associated with non-codebook usage; and transmit, to the base station, a single antenna-panel uplink transmission or a multiple antenna-panel uplink transmission based at least in part on a determination of whether the single precoder indication indicates the single antenna-panel uplink transmission or the multiple antenna-panel uplink transmission.

In some aspects, a non-transitory computer-readable medium may store one or more instructions for wireless communication. The one or more instructions, when executed by one or more processors of a base station, may cause the one or more processors to transmit, to a UE, DCI that indicates a single precoder indication associated with non-codebook usage; and receive, from the UE, a single antenna-panel uplink transmission or a multiple antenna-panel uplink transmission based at least in part on whether the single precoder indication indicates the single antenna-panel uplink transmission or the multiple antenna-panel uplink transmission.

In some aspects, a UE for wireless communication may include a memory and one or more processors operatively coupled to the memory. The memory and the one or more processors may be configured to receive, from a base station, DCI that indicates a single precoder indication associated with non-codebook usage; and transmit, to the base station, a single antenna-panel uplink transmission or a multiple antenna-panel uplink transmission based at least in part on a determination of whether the single precoder indication indicates the single antenna-panel uplink transmission or the multiple antenna-panel uplink transmission.

In some aspects, a base station for wireless communication may include a memory and one or more processors operatively coupled to the memory. The memory and the one or more processors may be configured to transmit, to a UE, DCI that indicates a single precoder indication associated with non-codebook usage; and receive, from the UE, a single antenna-panel uplink transmission or a multiple antenna-panel uplink transmission based at least in part on whether the single precoder indication indicates the single antenna-panel uplink transmission or the multiple antenna-panel uplink transmission.

In some aspects, an apparatus for wireless communication may include means for receiving, from a base station, DCI that indicates a single precoder indication associated with non-codebook usage; and means for transmitting, to the base station, a single antenna-panel uplink transmission or a multiple antenna-panel uplink transmission based at least in part on a determination of whether the single precoder indication indicates the single antenna-panel uplink transmission or the multiple antenna-panel uplink transmission.

In some aspects, an apparatus for wireless communication may include means for transmitting, to a UE, DCI that indicates a single precoder indication associated with non-codebook usage; and means for receiving, from the UE, a single antenna-panel uplink transmission or a multiple antenna-panel uplink transmission based at least in part on whether the single precoder indication indicates the single antenna-panel uplink transmission or the multiple antenna-panel uplink transmission.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technologies (RAT), aspects of the present disclosure can be applied to other RATs, such as a 3G RAT, a 4G RAT, and/or a RAT subsequent to 5G (e.g., 6G).

Figure 1:
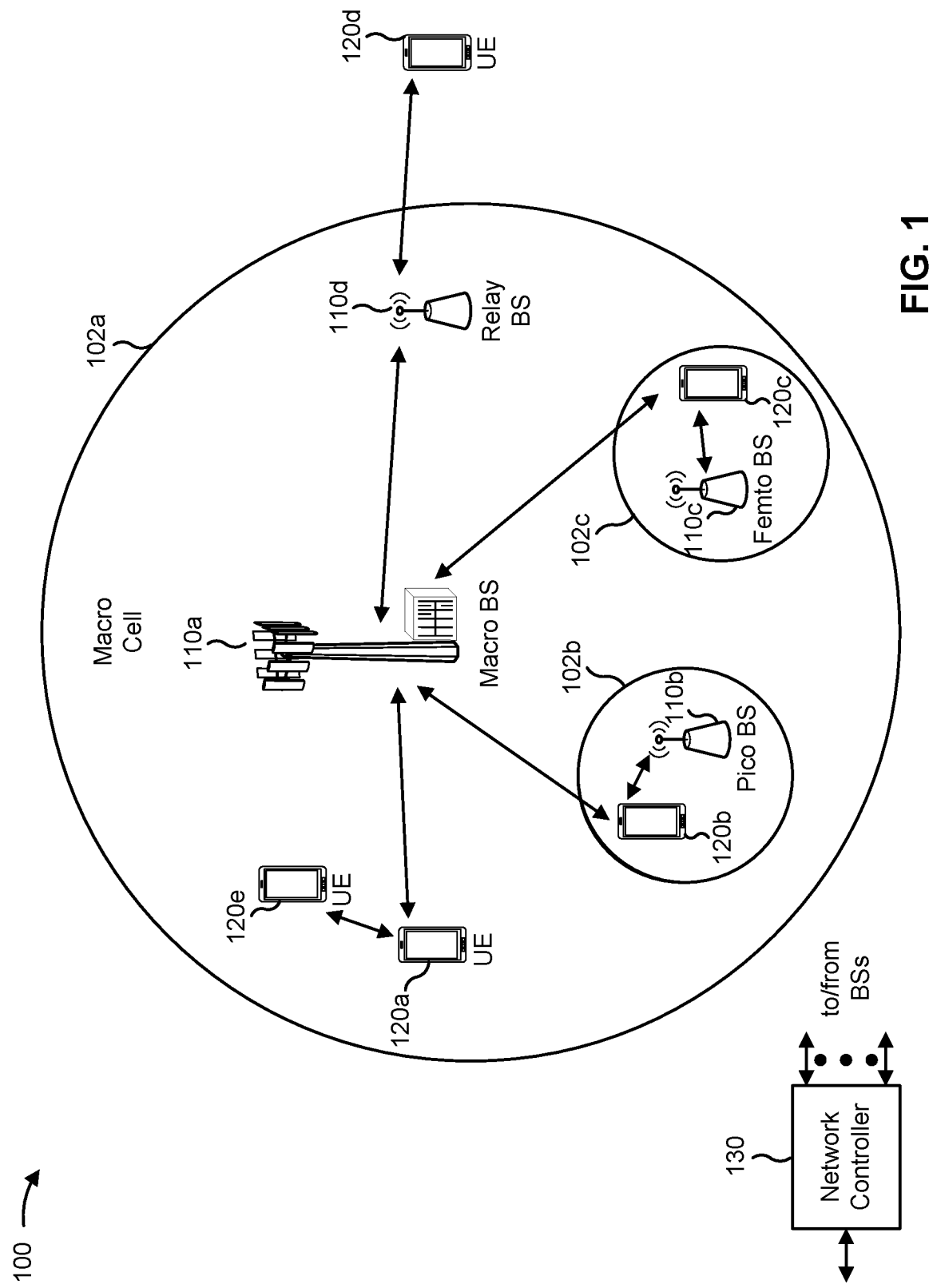
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
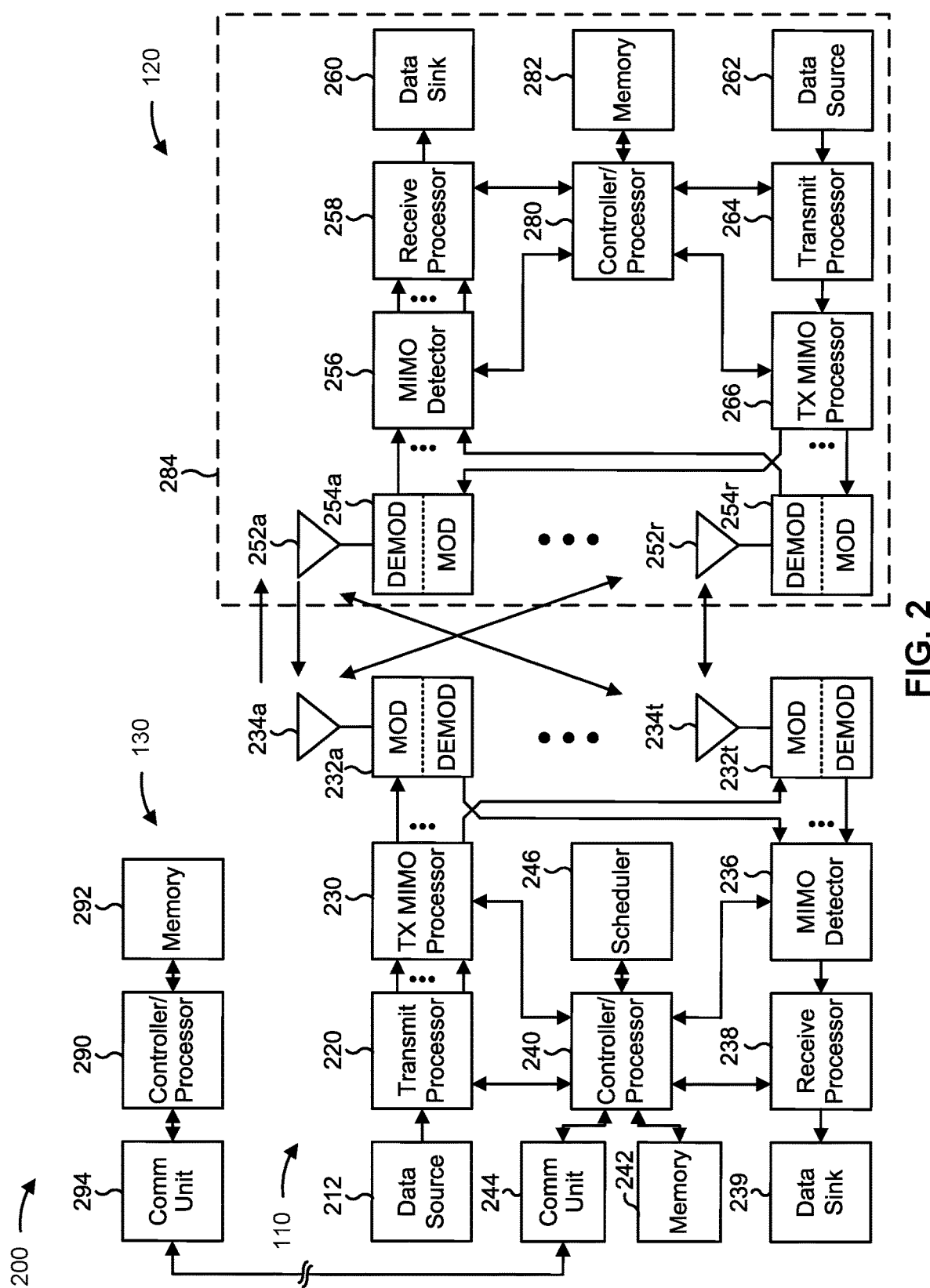
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 6A-6C, 7, and 8.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 6A-6C, 7, and 8.

Controller/processor 240 of base station 110, controller/processor 280 of UE 120, and/or any other component(s) of FIG. 2 may perform one or more techniques associated with precoder indication for non-codebook-based uplink transmissions, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, program code, and/or the like) for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, interpreting the instructions, and/or the like.

In some aspects, UE 120 may include means for receiving DCI that indicates a single precoder indication associated with non-codebook usage, means for transmitting a single antenna-panel uplink transmission or a multiple antenna-panel uplink transmission based at least in part on a determination of whether the single precoder indication indicates the single antenna-panel uplink transmission or the multiple antenna-panel uplink transmission, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting DCI that indicates a single precoder indication associated with non-codebook usage, means for receiving a single antenna-panel uplink transmission or a multiple antenna-panel uplink transmission based at least in part on whether the single precoder indication indicates the single antenna-panel uplink transmission or the multiple antenna-panel uplink transmission, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of processor 280.

As indicated above, FIG. 2 is provided as an example. Other examples may differ from what is described with regard to FIG. 2.

Figure 3:
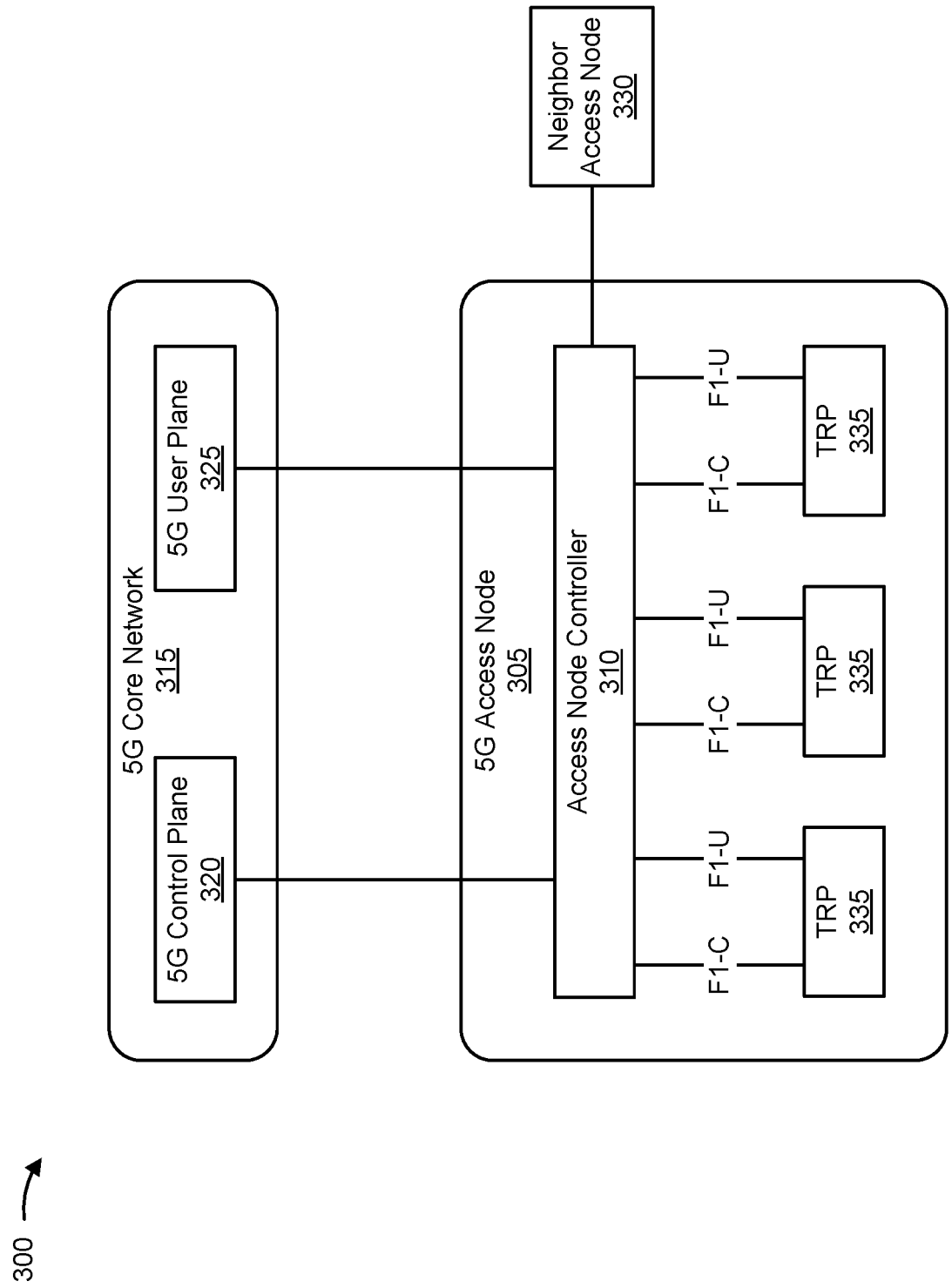
FIG. 3 illustrates an example logical architecture of a distributed radio access network (RAN), according to aspects of the present disclosure.

FIG. 3 illustrates an example logical architecture of a distributed RAN 300, according to aspects of the present disclosure.

A 5G access node 305 may include an access node controller 310. The access node controller 310 may be a central unit (CU) of the distributed RAN 300. In some aspects, a backhaul interface to a 5G core network 315 may terminate at the access node controller 310. The 5G core network 315 may include a 5G control plane component 320 and a 5G user plane component 325 (e.g., a 5G gateway), and the backhaul interface for one or both of the 5G control plane and the 5G user plane may terminate at the access node controller 310. Additionally, or alternatively, a backhaul interface to one or more neighbor access nodes 330 (e.g., another 5G access node 305, an LTE access node, and/or the like) may terminate at the access node controller 310.

The access node controller 310 may include and/or may communicate with one or more TRPs 335 (e.g., via an F1 Control (F1-C) interface and/or an F1 User (F1-U) interface). A TRP 335 may be a distributed unit (DU) of the distributed RAN 300. In some aspects, a TRP 335 may correspond to a base station 110 described above in connection with FIG. 1. For example, different TRPs 335 may be included in different base stations 110. Additionally, or alternatively, multiple TRPs 335 may be included in a single base station 110. In some aspects, a base station 110 may include a CU (e.g., access node controller 310) and/or one or more DUs (e.g., one or more TRPs 335). In some cases, a TRP 335 may be referred to as a cell, a panel, an antenna array, an array, and/or the like.

A TRP 335 may be connected to a single access node controller 310 or to multiple access node controllers 310. In some aspects, a dynamic configuration of split logical functions may be present within the architecture of distributed RAN 300. For example, a packet data convergence protocol (PDCP) layer, a radio link control (RLC) layer, a medium access control (MAC) layer, and/or the like may be configured to terminate at the access node controller 310 or at a TRP 335.

In some aspects, multiple TRPs 335 may transmit communications (e.g., the same communication or different communications) in the same transmission time interval (TTI) (e.g., a slot, a mini-slot, a subframe, a symbol, and/or the like) or different TTIs using different quasi-co-location (QCL) relationships (e.g., different spatial parameters, different transmission configuration indicator (TCI) states, different precoding parameters, different beamforming parameters, and/or the like). In some aspects, a TCI state may be used to indicate one or more QCL relationships. A TRP 335 may be configured to individually (e.g., using dynamic selection) or jointly (e.g., using joint transmission with one or more other TRPs 335) serve traffic to a UE 120.

As indicated above, FIG. 3 is provided as an example. Other examples may differ from what was described with regard to FIG. 3.

Figure 4:
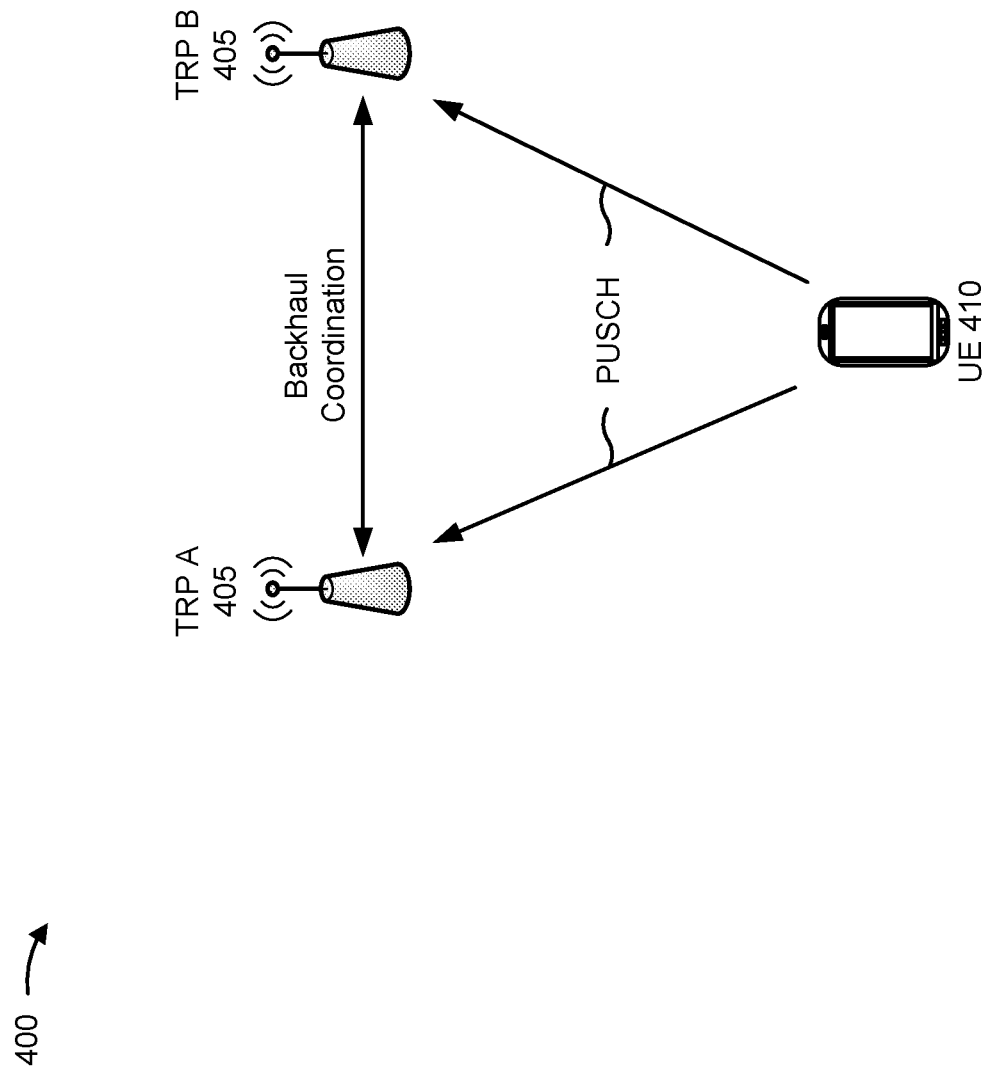
FIG. 4 is a diagram illustrating an example of multiple transmit receive point (multi-TRP) communication, in accordance with various aspects of the present disclosure.

FIG. 4 is a diagram illustrating an example 400 of multi-TRP communication (sometimes referred to as multi-panel communication), in accordance with various aspects of the present disclosure. As shown in FIG. 4, multiple TRPs 405 may communicate with the same UE 410. A TRP 405 may correspond to a TRP 335 described above in connection with FIG. 3.

The multiple TRPs 405 (shown as TRP A and TRP B) may communicate with the same UE 410 in a coordinated manner (e.g., using coordinated multipoint transmissions and/or the like) to improve reliability, increase throughput, and/or the like. The TRPs 405 may coordinate such communications via an interface between the TRPs 405 (e.g., a backhaul interface, an access node controller 310, and/or the like). The interface may have a smaller delay and/or higher capacity when the TRPs 405 are co-located at the same base station 110 (e.g., when the TRPs 405 are different antenna arrays or panels of the same base station 110), and may have a larger delay and/or lower capacity (as compared to co-location) when the TRPs 405 are located at different base stations 110. The different TRPs 405 may communicate with the UE 410 using different QCL relationships (e.g., different TCI states), different demodulation reference signal (DMRS) ports, different layers (e.g., of a multi-layer communication), and/or the like.

As indicated above, FIG. 4 is provided as an example. Other examples may differ from what is described with respect to FIG. 4.

Figure 5:
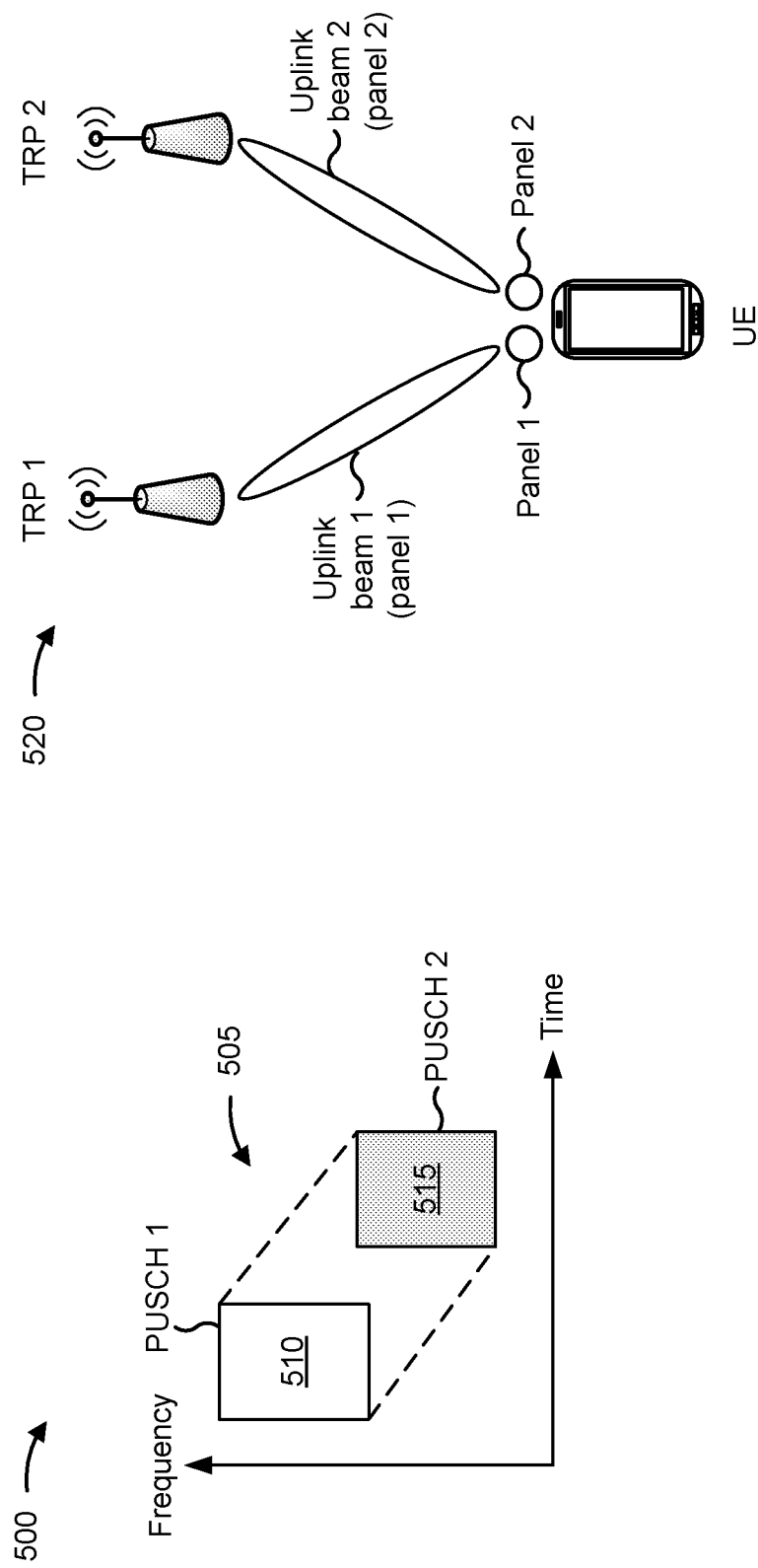
FIG. 5 is a diagram illustrating an example of multiple antenna panel (multi-panel) simultaneous uplink transmission, in accordance with various aspects of the present disclosure.

FIG. 5 is a diagram illustrating an example of multi-panel simultaneous uplink transmission, in accordance with various aspects of the present disclosure. In particular, reference number 505 shows spatial division multiplexing (SDM) of a first physical uplink shared channel (PUSCH) transmission 510 (shown as PUSCH 1) and a second PUSCH transmission 515 (shown as PUSCH 2). In SDM, a UE may transmit the first PUSCH transmission 510 and the second PUSCH transmission 515 in a same time and frequency resource (e.g., as scheduled by a single DCI). In some cases, SDM may be used to improve spectral efficiency and/or improve reliability.

As shown by reference number 520, a UE may transmit the first PUSCH transmission 510 using a first antenna panel of the UE, and the second PUSCH transmission 515 using a second antenna panel of the UE. An antenna panel may refer to a group of antenna ports. In some aspects, the UE may form a first beam on the first antenna panel using a first precoding to precode the first PUSCH 510, and form a second beam on the second antenna panel using a second precoding to precode the second PUSCH 515. A beam may be an analog beam, which may be indicated by an uplink transmission configuration indicator (TCI) state or spatial relationship information, such as a channel state information reference signal (CSI-RS) identifier, a sounding reference signal (SRS) identifier, or a synchronization signal block (SSB) identifier. In some cases, there may not be identifiers that are defined to explicitly indicate (e.g., in downlink control information (DCI)) the first antenna panel and the second antenna panel. The UE may transmit the first PUSCH transmission 510 (e.g., using the first antenna panel) to a first TRP (e.g., a TRP 335, TRP A 405, and/or the like), and the second PUSCH transmission 515 (e.g., using the second antenna panel) to a second TRP (e.g., a TRP 335, TRP B 405, and/or the like). The first TRP and the second TRP may be located at a same base station or different base stations.

In some cases, a base station may transmit DCI that provides a precoder indication for an uplink transmission of a UE. For example, for a single-panel, non-codebook uplink MIMO transmission of the UE, the DCI may provide a single precoder indication, which the UE may use to determine a precoding for the uplink transmission. However, wireless networks generally lack support for techniques to signal, configure, or otherwise indicate precodings for multi-panel, non-codebook uplink MIMO transmissions. Moreover, the use of multiple precoder indications in DCI (e.g., respective precoder indications for each antenna panel) may be inefficient, may increase a size of the DCI, may cause excessive signaling overhead, and/or the like.

Some techniques and apparatuses described herein use a single precoder indication (e.g., in DCI) to indicate precodings for a multi-panel, non-codebook uplink MIMO transmission. In some aspects, the single precoder indication may indicate precoders across multiple antenna panels. In this way, the single precoder indication may be used to indicate multiple precoders for multiple antenna panels, thereby improving signaling efficiency, reducing signaling overhead, and/or the like.

As indicated above, FIG. 5 is provided as an example. Other examples may differ from what is described with respect to FIG. 5.

Figure 6A:
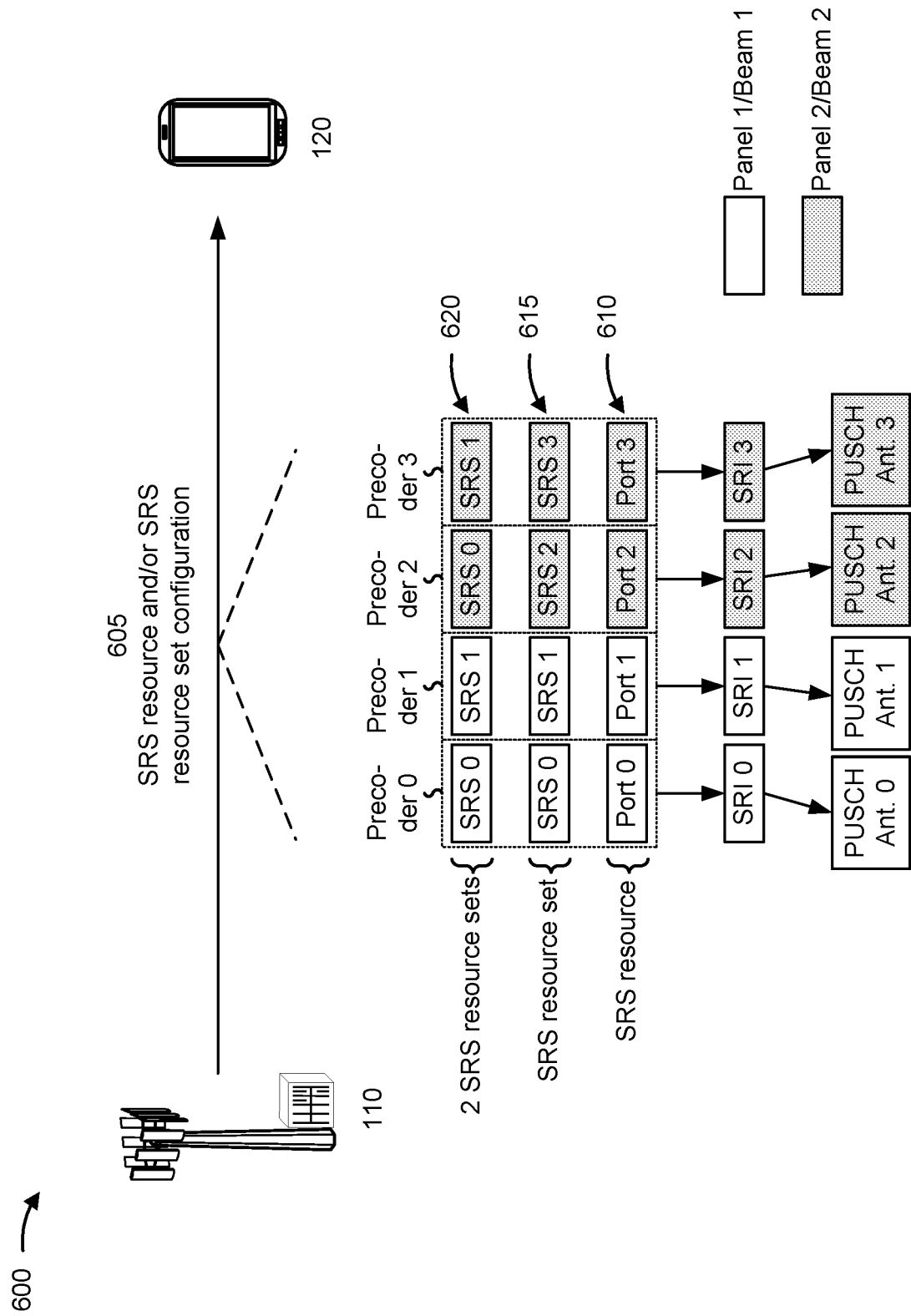
FIGS. 6A-6C are diagrams illustrating examples associated with precoder indication for non-codebook-based uplink transmissions, in accordance with various aspects of the present disclosure.
Figure 6B:
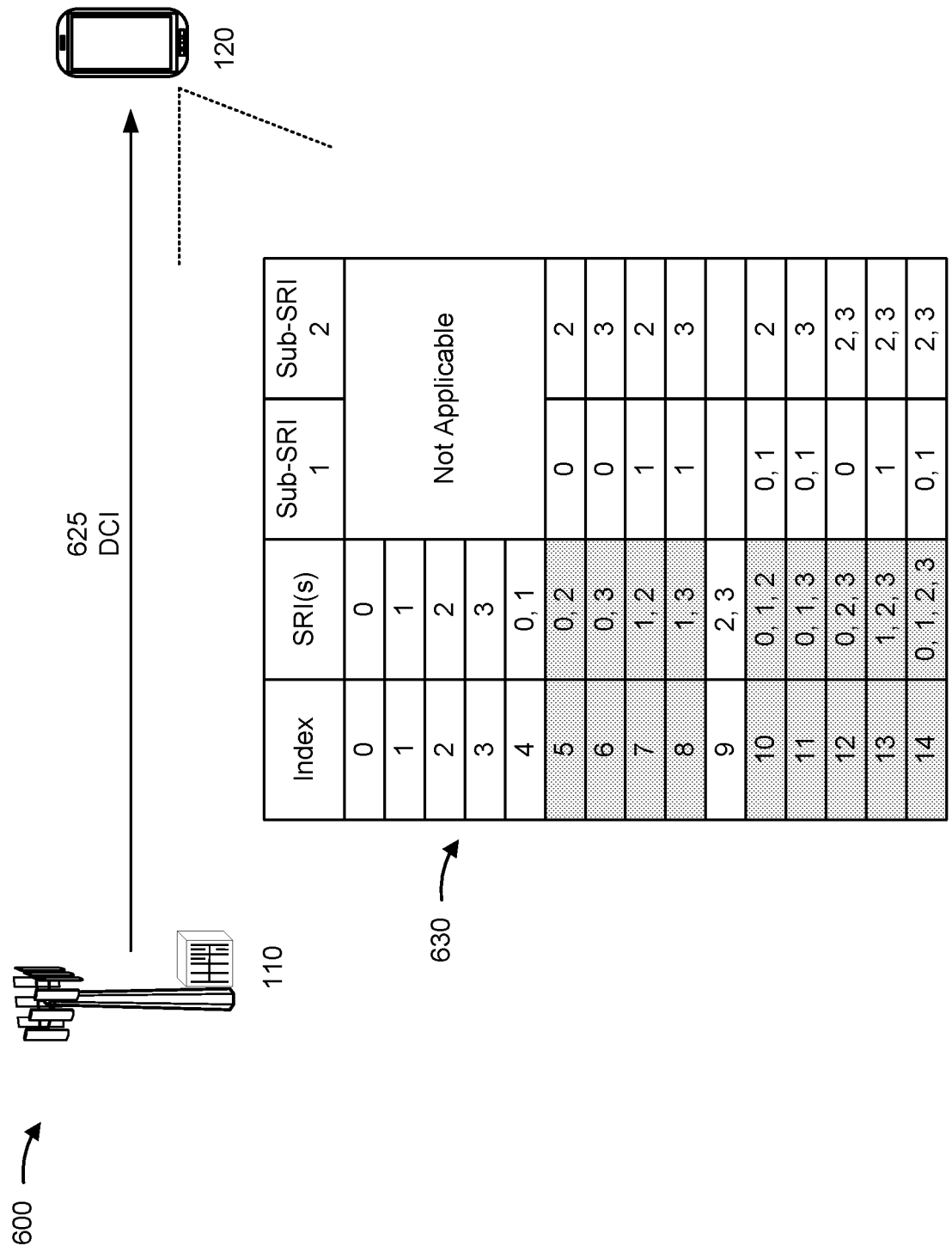
Figure 6C:
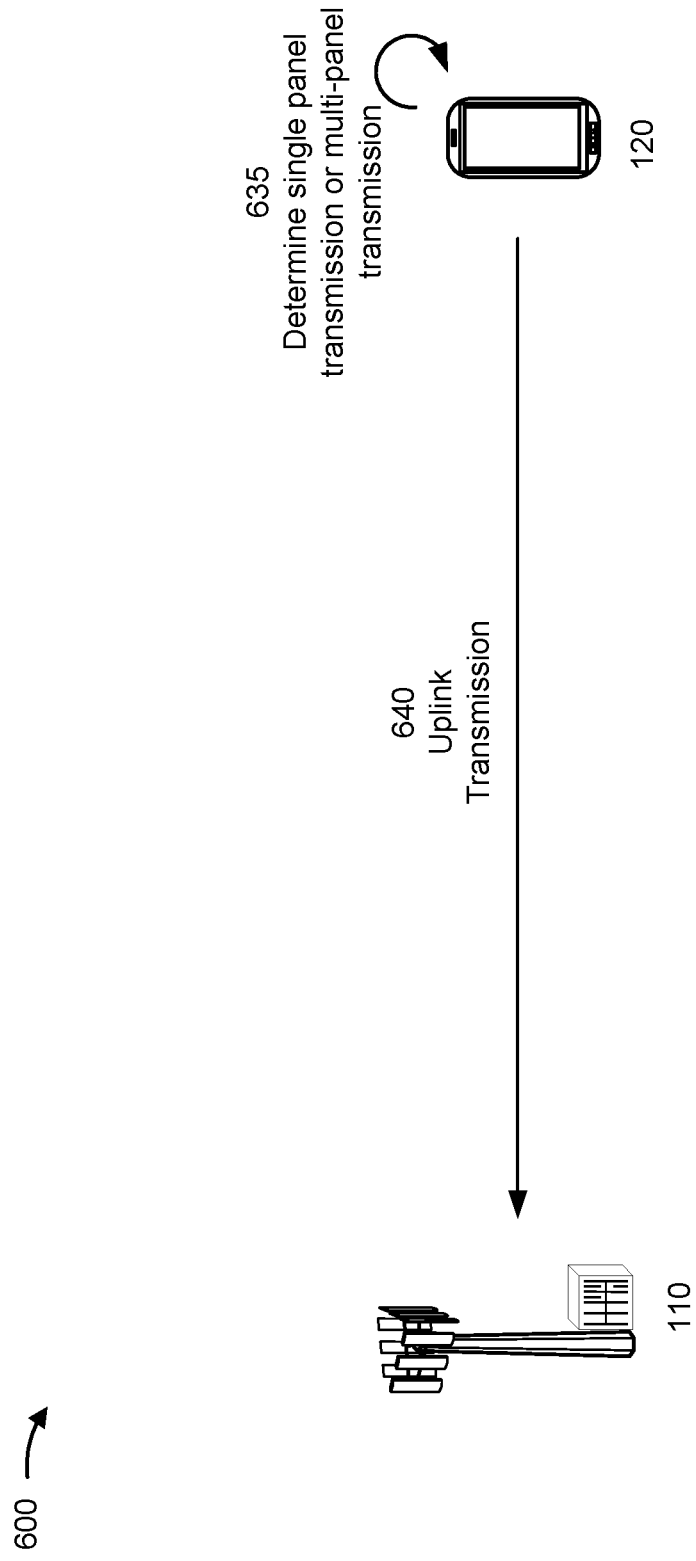

FIGS. 6A-6C are diagrams illustrating one or more examples 600 associated with precoder indication for non-codebook-based uplink transmissions (e.g., MIMO transmissions), in accordance with various aspects of the present disclosure. As shown in FIGS. 6A-6C, example 600 includes a base station 110 and a UE 120. In some aspects, the base station 110 may include a first TRP (e.g., a TRP 335, TRP A 405, and/or the like) and a second TRP (e.g., a TRP 335, TRP B 405, and/or the like). In some aspects, the base station 110 may correspond to a TRP (e.g., TRP 335, TRP A 405, TRP B 405, and/or the like). In some aspects, the first TRP may be associated with a first base station 110, and the second TRP may be associated with a second base station 110. In some aspects, the UE 120 may include multiple antenna panels (e.g., a first antenna panel and a second antenna panel). In some aspects, the UE 120 may correspond to UE 410, and/or the like.

As shown in FIG. 6A, and by reference number 605, the base station 110 may transmit, and the UE 120 may receive, one or more sounding reference signal (SRS) resource configurations and/or one or more SRS resource set configurations (e.g., for non-codebook-based MIMO transmissions of the UE 120). In some aspects, the UE 120 may receive a configuration for an SRS resource that indicates a beam for the SRS resource. In some aspects, the SRS resource may be configured for non-codebook usage.

In some aspects, an SRS resource may be configured with one or more SRS ports. In some cases, an SRS port may be referred to as an SRS antenna port. For example, as shown by reference number 610, the SRS resource may be configured with one or more first SRS ports associated with a first SRS port group (e.g., port 0 and port 1), and one or more second SRS ports associated with a second SRS port group (e.g., port 2 and port 3). In this case, the one or more first SRS ports of the first SRS port group may be configured with a first beam, and the one or more second SRS ports of the second SRS port group may be configured with a second beam. A beam may be an analog beam, which may be indicated by an uplink TCI state or spatial relationship information, such as a CSI-RS identifier, an SRS identifier, or an SSB identifier. Moreover, each SRS port may use a respective precoder (e.g., the SRS ports may be independently precoded). For example, port 0 may use precoder 0, port 1 may use precoder 1, port 2 may use precoder 2, and port 3 may use precoder 3.

In some aspects, the UE 120 may receive a configuration for an SRS resource set that indicates one or more SRS resources for the SRS resource set. In some aspects, the SRS resource set may be configured for non-codebook usage.

In some aspects, as shown by reference number 615, the UE 120 may be configured with an SRS resource set that includes first SRS resources (e.g., SRS 0 and SRS 1) configured with a first beam and second SRS resources (e.g., SRS 2 and SRS 3) configured with a second beam. A beam may be an analog beam, which may be indicated by an uplink TCI state or spatial relationship information, such as a CSI-RS identifier, an SRS identifier, or an SSB identifier. Moreover, each SRS resource may use a respective precoder (e.g., the SRS resources may be independently precoded). For example, SRS 0 may use precoder 0, SRS 1 may use precoder 1, SRS 2 may use precoder 2, and SRS 3 may use precoder 3. In some aspects, the SRS resources in the SRS resource set may have only a single SRS antenna port.

In some aspects, as shown by reference number 620, the UE 120 may be configured with a first SRS resource set that includes first SRS resources (e.g., SRS 0 and SRS 1 of the first SRS resource set) configured with a first beam, and a second SRS resource set that includes second SRS resources (e.g., SRS 0 and SRS 1 of the second SRS resource set) configured with a second beam. A beam may be an analog beam, which may be indicated by an uplink TCI state or spatial relationship information, such as a CSI-RS identifier, an SRS identifier, or an SSB identifier. Moreover, each SRS resource may use a respective precoder (e.g., the SRS resources may be independently precoded). For example, SRS 0 of the first SRS resource set may use precoder 0, SRS 1 of the first SRS resource set may use precoder 1, SRS 0 of the second SRS resource set may use precoder 2, and SRS 1 of the second SRS resource set may use precoder 3. In some aspects, the SRS resources, in the first SRS resource set and the second SRS resource set, may have only a single SRS antenna port.

As further shown in FIG. 6A, the UE 120 may be configured to support cross-panel precoder indexing (e.g., in order to support a single precoder indication for multiple antenna panels, as described below). According to cross-panel precoder indexing, SRS resource sets, SRS resources, SRS ports, and/or PUSCH antenna ports that are indicated for the UE 120 may be indexed across multiple antenna panels. In this way, a single precoder indication, as described below, may be used for multiple antenna panels, rather than using respective precoder indications for each antenna panel.

As an example, a first SRS resource (e.g., SRS 0 in the SRS resource set shown by reference number 615, SRS 0 in the first SRS resource set shown by reference number 620, and/or the like) or a first SRS port (e.g., SRS port 0 shown by reference number 610, and/or the like) that uses a first precoder may be associated with a first SRS resource indicator (SRI) 0 (or another precoder indicator); a second SRS resource (e.g., SRS 1 in the SRS resource set shown by reference number 615, SRS 1 in the first SRS resource set shown by reference number 620, and/or the like) or a second SRS port (e.g., SRS port 1 shown by reference number 610, and/or the like) that uses a second precoder may be associated with a second SRI 1; a third SRS resource (e.g., SRS 2 in the SRS resource set shown by reference number 615, SRS 0 in the second SRS resource set shown by reference number 620, and/or the like) or a third SRS port (e.g., SRS port 2 shown by reference number 610, and/or the like) that uses a third precoder may be associated with a third SRI 2; and a fourth SRS resource (e.g., SRS 3 in the SRS resource set shown by reference number 615, SRS 1 in the second SRS resource set shown by reference number 620, and/or the like) or a fourth SRS port (e.g., SRS port 3 shown by reference number 610, and/or the like) that uses a fourth precoder may be associated with a fourth SRI 3. Continuing with the previous example, the SRS resources or SRS ports associated with the first SRI and the second SRI (SRI 0 and SRI 1) may be associated with a first antenna panel of the UE 120, and the SRS resources or SRS ports associated with the third SRI and the fourth SRI (SRI 2 and SRI 3) may be associated with a second antenna panel of the UE 120. Moreover, the first SRI and the second SRI may be respectively associated with a first PUSCH antenna port (PUSCH ant. 0) and a second PUSCH antenna port (PUSCH ant. 1), which are associated with the first antenna panel of the UE 120, and the third SRI and the fourth SRI may be respectively associated with a third PUSCH antenna port (PUSCH ant. 2) and a fourth PUSCH antenna port (PUSCH ant. 3), which are associated with the second antenna panel of the UE 120.

As shown in FIG. 6B, and by reference number 625, the base station 110 may transmit, and the UE 120 may receive, DCI. The DCI may schedule an uplink transmission (e.g., a multi-panel uplink transmission or a single-panel uplink transmission) of the UE 120. In some aspects, the DCI may include a single precoder indication (e.g., used for the multi-panel uplink transmission or the single-panel uplink transmission).

The single precoder indication may be associated with non-codebook usage. In other words, the single precoder indication may be for a non-codebook-based MIMO transmission of the UE 120. Accordingly, the DCI may indicate the single precoder indication in an SRI field of the DCI. For example, the single precoder indication may be an SRI index value that indicates one or more SRI values according to a mapping. As an example, in mapping 630, SRI index value 5 maps to SRI value 0 and SRI value 2.

Thus, the single precoder indication may indicate multiple (e.g., two) layers for a PUSCH transmission (where the quantity of layers is equivalent to the quantity of SRI values indicated by the single precoder indication), and the precoders for precoding the multiple layers are respectively indicated by the SRI values. For example, the single precoder indication may be SRI index value 5, which indicates two layers that use precoders indicated by SRI value 0 and SRI value 2, respectively. In this example, the precoder that was used to precode the SRS resource or the SRS port identified by SRI value 0 (e.g., SRS 0 in the SRS resource set shown by reference number 615, SRS 0 in the first SRS resource set shown by reference number 620, SRS port 0 shown by reference number 610, and/or the like) is also used to precode the first layer, and the precoder that was used to precode the SRS resource or SRS port identified by SRI value 2 (e.g., SRS 2 in the SRS resource set shown by reference number 615, SRS 0 in the second SRS resource set shown by reference number 620, SRS port 2 shown by reference number 610, and/or the like) is used to precode the second layer. Moreover, the single precoder indication (e.g., the SRI index value) may also indicate PUSCH antenna ports that are to be used to transmit the multiple layers (e.g., a PUSCH antenna port associated with an SRI value is used to transmit a layer indicated by the SRI value). For example, continuing with the example above, the first layer is transmitted using PUSCH antenna port 0, which is associated with SRI value 0, and the second layer is transmitted using PUSCH antenna port 2, which is associated with SRI value 2.

As described below, the single precoder indication may be used to indicate multiple sub-precoder indications, such that the mapping 630 may be used for multi-panel-based uplink MIMO. In this way, the UE 120 may conserve memory resources, storage resources, and/or the like, that may otherwise be used to store multiple mappings.

In some aspects, the DCI may include a DMRS indication. For example, the DMRS indication may be a DMRS index value that indicates (e.g., according to a mapping) one or more DMRS ports that are to be used for the uplink transmission of the UE 120. As an example, DMRS index value 1 may map to DMRS ports 0-2 according to the mapping. In some aspects, the indicated DMRS ports may be associated with multiple code-division multiplexing (CDM) groups (e.g., for a multi-panel uplink transmission). The UE 120 may be configured with one or more mappings (e.g., a first mapping for DMRS configuration type 1, a second mapping for DMRS configuration type 2, and/or the like, in accordance with 3GPP NR Release 15 or Release 16) of DMRS ports to CDM groups (e.g., to determine an association of a DMRS port with a CDM group (of up to three CDM groups)). For example, DMRS port 0 may map to CDM group 0, DMRS port 1 may map to CDM group 0, DMRS port 2 may map to CDM group 1, DMRS port 3 may map to CDM group 1, and so forth (e.g., for DMRS configuration type 2). Each indicated DMRS port may be used as the DMRS for a layer in a PUSCH transmission precoded by a precoder.

In some aspects, a new DMRS entry may be defined for multi-panel uplink transmission. The new DMRS entry may include a DMRS index value that indicates (e.g., maps to) DMRS ports 0, 2, and 3. This new DMRS entry may support multi-panel uplink transmission when DMRS port 0 is associated with a first CDM group (e.g., CDM group 0), and DMRS ports 2 and 3 are associated with a second CDM group (e.g., CDM group 1).

As shown in FIG. 6C, and by reference number 635, the UE 120 may determine whether the DCI schedules a single-panel uplink transmission or a multi-panel uplink transmission. For example, the UE 120 may determine whether the DCI schedules a single-panel uplink transmission or a multi-panel uplink transmission based at least in part on the single precoder indication (e.g., SRI index value) of the DCI. In some aspects, the UE 120 may determine that the DCI schedules a single-panel uplink transmission based at least in part on a determination that the single precoder indication indicates one or more SRI values associated with SRS resources (e.g., in the same SRS resource set as shown by reference number 615, or in different SRS resource sets as shown by reference number 620) configured with the same beam and/or one or more SRS ports (e.g., configured for an SRS resource as shown by reference number 610) configured with the same beam. In other words, the single precoder indication indicates a single-panel uplink transmission when only a single beam is associated by the indicated SRS resources or SRS ports.

In some aspects, the UE 120 may determine that the DCI schedules a multi-panel uplink transmission based at least in part on a determination that the single precoder indication indicates one or more SRS resources (e.g., in the same SRS resource set as shown by reference number 615, or in different SRS resource sets as shown by reference number 620) configured with different beams and/or one or more SRS ports (e.g., configured for an SRS resource as shown by reference number 610) configured with different beams. In other words, the single precoder indication indicates a multi-panel uplink transmission when multiple beams are associated by the indicated SRS resources or SRS ports. As shown by mapping 630 (FIG. 6B), SRI index values 5-8 and 10-14 (shown with shading) indicate multi-panel uplink transmissions (e.g., because these SRI index values indicate SRI values associated with different beams or different antenna panels, as described above in connection with FIG. 6A).

For example, a multi-panel uplink transmission is indicated when the single precoder indication indicates one or more first SRS resources, of an SRS resource set, configured with a first beam, and one more second SRS resources, of the same SRS resource set, configured with a second beam (e.g., as shown by reference number 615). As another example, a multi-panel uplink transmission is indicated when the single precoder indication indicates one or more first SRS resources, of a first SRS resource set, configured with a first beam, and one more second SRS resources, of a second different SRS resource set, configured with a second beam (e.g., as shown by reference number 620). As a further example, a multi-panel uplink transmission is indicated when the single precoder indication indicates one or more first SRS ports, of an SRS resource, configured with a first beam, and one more second SRS ports, of the same SRS resource, configured with a second beam (e.g., as shown by reference number 610).

In the case of a multi-panel uplink transmission, the single precoder indication may indicate precoders that are indexed across multiple antenna panels of the UE 120, as described above. Moreover, in the case of a multi-panel uplink transmission, the UE 120 may determine that the single precoder indication indicates a first sub-precoder indication (e.g., for a first antenna panel of the UE 120) and a second sub-precoder indication (e.g., for a second antenna panel of the UE 120). That is, the UE 120 may decouple the single precoder indication into a first sub-precoder indication and a second sub-precoder indication.

For example, the single precoder indication may be an SRI index value, and the SRI index value may map to multiple SRI values. Continuing with the previous example, a first set of the multiple SRI values may form a first sub-precoder (e.g., sub-SRI) indication, and a second set of the multiple SRI values may form a second sub-precoder (e.g., sub-SRI) indication. As an example, as shown by mapping 630 (FIG. 6B), SRI index value 12 maps to SRI values 0, 2, and 3; SRI value 0 (mapped to the first antenna panel of the UE 120, as described above) is a first sub-SRI indication; and SRI values 2 and 3 (mapped to the second antenna panel of the UE 120, as described above) are a second sub-SRI indication.

The first sub-precoder indication, therefore, indicates SRS resource(s) or SRS port(s) configured with a first beam and associated with a first antenna panel of the UE 120. Similarly, the second sub-precoder indication indicates SRS resource(s) or SRS port(s) configured with a second beam and associated with a second antenna panel of the UE 120. Moreover, the precoders that are applied to precode the SRS resources(s) or SRS port(s) indicated by a sub-precoder indication are also used to precode the corresponding layers of the PUSCH that are to be transmitted on the antenna panel associated with the sub-precoder indication. In some aspects, the layers associated with the sub-precoder indication, that are to be transmitted on the antenna panel, may use the same beam as the SRS resources(s) or SRS port(s) associated by the sub-precoder indication.

In addition, the UE 120 may determine a mapping of layers to the DMRS ports indicated by the DCI. In some aspects, the indicated DMRS ports and the indicated layers (e.g., by the SRI index value in the DCI) may be mapped in order. For example, the UE 120 may determine that layers of a first PUSCH indicated by the first sub-precoder indication are mapped to the indicated DMRS ports that are in a first CDM group, and that layers of a second PUSCH indicated by the second sub-precoder indication are mapped to the indicated DMRS ports that are in a second CDM group. For example, if the DCI indicates an SRI index value that maps to SRI values 0, 2, and 3, and indicates DMRS ports 0, 2, and 3, the UE 120 may determine that SRI value 0 (e.g., the first sub-precoder indication) is associated with DMRS port 0 (e.g., in CDM group 0) for a first layer of a first PUSCH transmission, and that SRI values 2 and 3 (e.g., the second sub-precoder indication) are associated with DMRS ports 2 and 3 (e.g., in CDM group 1) for second and third layers of a second PUSCH transmission. The first PUSCH transmission and the second PUSCH transmission may be transmitted by a first antenna panel and a second antenna panel, respectively.

As shown by reference number 640, the UE 120 may transmit, and the base station 110 may receive, the uplink transmission (e.g., according to the DCI). For example, the UE 120 may transmit the uplink transmission based at least in part on a determination of whether the single precoder indication of the DCI indicates a single-panel uplink transmission or a multi-panel uplink transmission.

In some aspects, the UE 120 may determine that the DCI indicates a multi-panel uplink transmission, as described above, and the UE 120 may transmit the multi-panel uplink transmission based at least in part on the DCI (e.g., according to the precoding indicated by the single precoder indication, using the indicated DMRS ports, and/or the like). In this case, the UE 120 may perform a simultaneous uplink transmission (e.g., using SDM) using multiple antenna panels and multiple beams (e.g., a non-codebook-based MIMO transmission). For example, the UE may transmit a first PUSCH transmission on a first antenna panel using a first beam (e.g., using precoding determined for the first antenna panel, as described above), and transmit a second PUSCH transmission on a second antenna panel using a second beam (e.g., using precoding determined for the second antenna panel, as described above). In some aspects, the UE 120 may transmit the first PUSCH transmission to a first TRP (e.g., associated with the base station 110) and the second PUSCH transmission to a second TRP (e.g., associated with the base station 110 or another base station).

In some aspects, the UE 120 may determine that the DCI indicates a single-panel uplink transmission, as described above, and the UE 120 may transit the single-panel uplink transmission based at least in part on the DCI. For example, the UE 120 may perform an uplink transmission using a single antenna panel and a single beam.

As indicated above, FIGS. 6A-6C are provided as one or more examples. Other examples may differ from what is described with respect to FIGS. 6A-6C.

Figure 7:
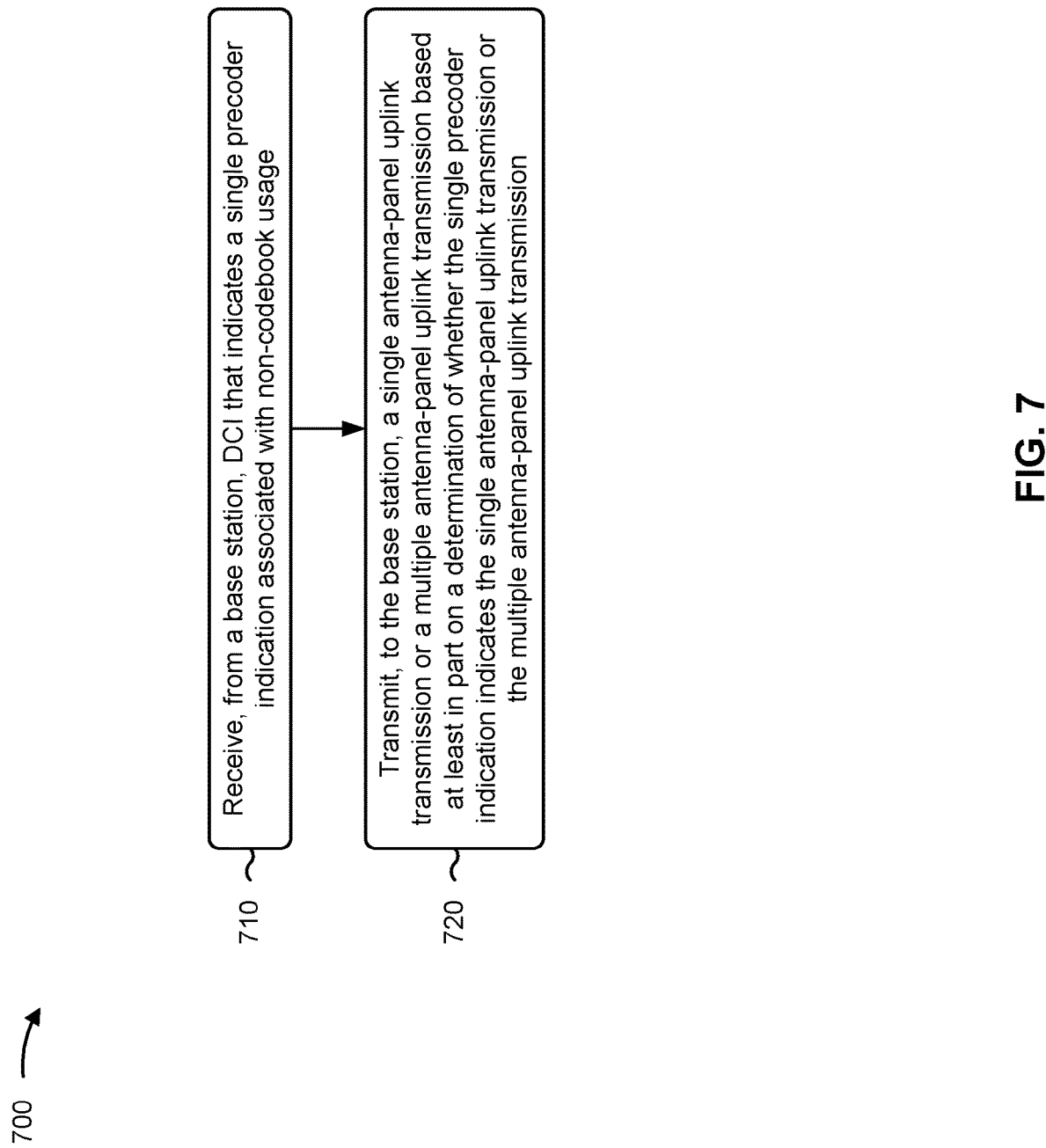
FIGS. 7 and 8 are diagrams illustrating example processes associated with precoder indication for non-codebook-based uplink transmissions, in accordance with various aspects of the present disclosure.

FIG. 7 is a diagram illustrating an example process 700 performed, for example, by a UE, in accordance with various aspects of the present disclosure. Example process 700 is an example where the UE (e.g., UE 120 and/or the like) performs operations associated with precoder indication for non-codebook-based uplink transmissions.

As shown in FIG. 7, in some aspects, process 700 may include receiving, from a base station, DCI that indicates a single precoder indication associated with non-codebook usage (block 710). For example, the UE (e.g., using antenna 252, DEMOD 254, MIMO detector 256, receive processor 258, controller/processor 280, and/or the like) may receive, from a base station, DCI that indicates a single precoder indication associated with non-codebook usage, as described above in connection with FIGS. 6A-6C.

As further shown in FIG. 7, in some aspects, process 700 may include transmitting, to the base station, a single antenna-panel uplink transmission or a multiple antenna-panel uplink transmission based at least in part on a determination of whether the single precoder indication indicates the single antenna-panel uplink transmission or the multiple antenna-panel uplink transmission (block 720). For example, the UE ((e.g., using controller/processor 280, transmit processor 264, TX MIMO processor 266, MOD 254, antenna 252, and/or the like) may transmit, to the base station, a single antenna-panel uplink transmission or a multiple antenna-panel uplink transmission based at least in part on a determination of whether the single precoder indication indicates the single antenna-panel transmission or the multiple antenna-panel uplink transmission, as described above in connection with FIGS. 6A-6C.

Process 700 may include additional aspects, such as any single aspect or any combination of aspects described below and/or in connection with one or more other processes described elsewhere herein.

In a first aspect, process 700 includes receiving a configuration for an SRS resource set, and the SRS resource set includes one or more first SRS resources configured with a first beam, and one more second SRS resources configured with a second beam.

In a second aspect, alone or in combination with the first aspect, process 700 includes receiving configurations for a first SRS resource set and a second SRS resource set, the first SRS resource set includes one or more first SRS resources configured with a first beam, and the second SRS resource set includes one more second SRS resources configured with a second beam.

In a third aspect, alone or in combination with one or more of the first and second aspects, process 700 includes receiving a configuration for an SRS resource, and the SRS resource includes one or more first SRS ports configured with a first beam, and one more second SRS ports configured with a second beam.

In a fourth aspect, alone or in combination with one or more of the first through third aspects, the single precoder indication indicates multiple SRS resources or multiple SRS ports, and the multiple SRS resources or the multiple SRS ports are associated with respective precodings.

In a fifth aspect, alone or in combination with one or more of the first through fourth aspects, the single precoder indication indicates precoders that are to be indexed across multiple antenna panels.

In a sixth aspect, alone or in combination with one or more of the first through fifth aspects, the single precoder indication is in an SRI field of the DCI.

In a seventh aspect, alone or in combination with one or more of the first through sixth aspects, the single precoder indication indicates a first sub-precoder indication for a first antenna panel, and a second sub-precoder indication for a second antenna panel.

In an eighth aspect, alone or in combination with one or more of the first through seventh aspects, the single precoder indication is determined to indicate the single antenna-panel uplink transmission based at least in part on a determination that the single precoder indication indicates one or more SRS resources or one or more SRS ports configured with a same beam.

In a ninth aspect, alone or in combination with one or more of the first through eighth aspects, the single precoder indication is determined to indicate the multiple antenna-panel uplink transmission based at least in part on a determination that the single precoder indication indicates one or more first SRS resources, of an SRS resource set, configured with a first beam, and one more second SRS resources, of the SRS resource set, configured with a second beam.

In a tenth aspect, alone or in combination with one or more of the first through ninth aspects, the one or more first SRS resources are associated with a first antenna panel and one or more DMRS ports of a first CDM group, and the one or more second SRS resources are associated with a second antenna panel and one or more DMRS ports of a second CDM group.

In an eleventh aspect, alone or in combination with one or more of the first through tenth aspects, the single precoder indication is determined to indicate the multiple panel uplink transmission based at least in part on a determination that the single precoder indication indicates one or more first SRS resources, of a first SRS resource set, configured with a first beam, and one more second SRS resources, of a second SRS resource set, configured with a second beam.

In a twelfth aspect, alone or in combination with one or more of the first through eleventh aspects, the one or more first SRS resources are associated with a first antenna panel and one or more DMRS ports of a first CDM group, and the one or more second SRS resources are associated with a second antenna panel and one or more DMRS ports of a second CDM group.

In a thirteenth aspect, alone or in combination with one or more of the first through twelfth aspects, the single precoder indication is determined to indicate the multiple panel uplink transmission based at least in part on a determination that the single precoder indication indicates one or more first SRS ports, of an SRS resource, configured with a first beam, and one more second SRS ports, of the SRS resource, configured with a second beam.

In a fourteenth aspect, alone or in combination with one or more of the first through thirteenth aspects, the one or more first SRS ports are associated with a first antenna panel and one or more DMRS ports of a first CDM group, and the one or more second SRS ports are associated with a second antenna panel and one or more DMRS ports of a second CDM group.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
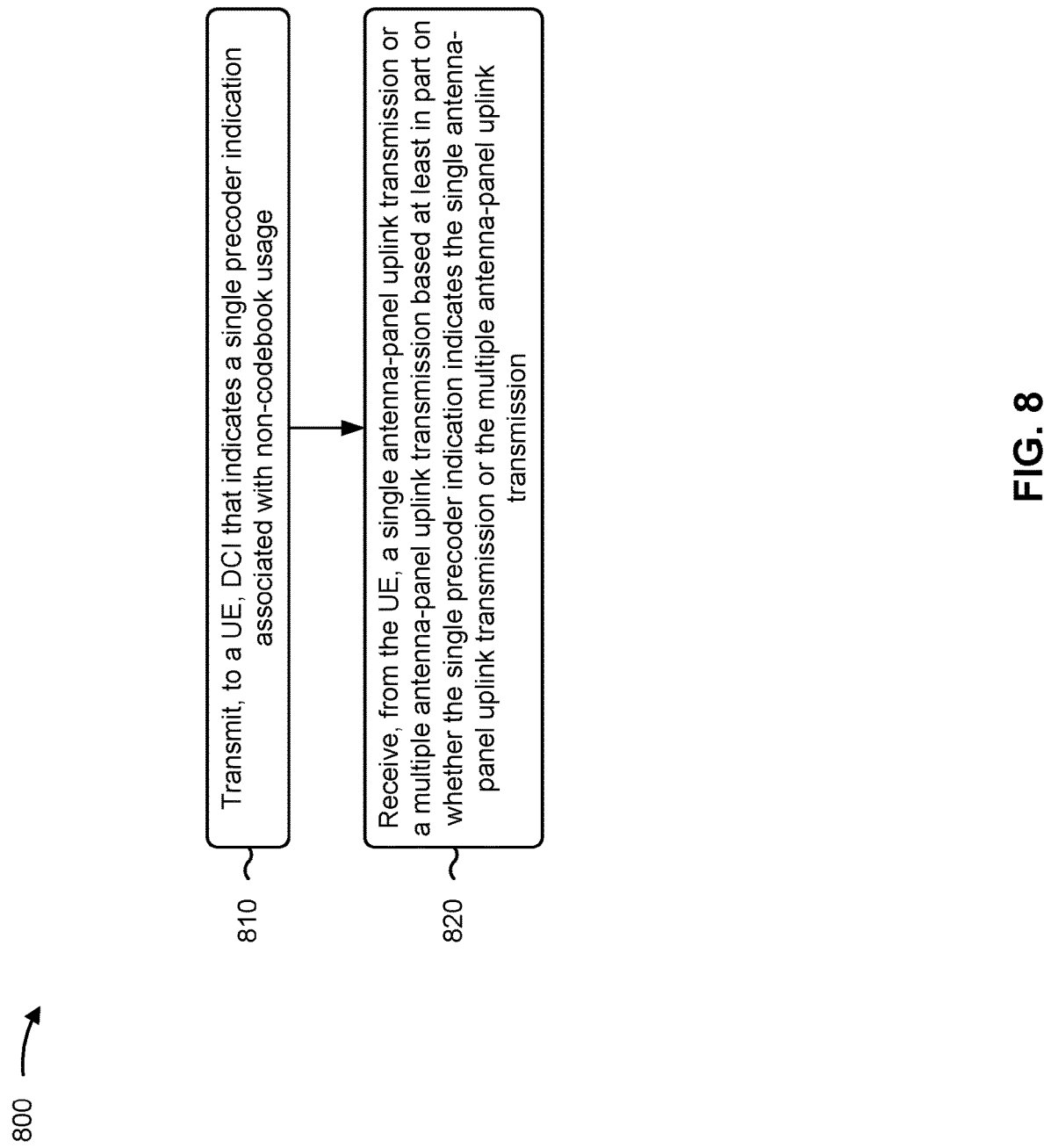

FIG. 8 is a diagram illustrating an example process 800 performed, for example, by a base station, in accordance with various aspects of the present disclosure. Example process 800 is an example where the base station (e.g., base station 110 and/or the like) performs operations associated with precoder indication for non-codebook-based uplink transmissions.

As shown in FIG. 8, in some aspects, process 800 may include transmitting, to a UE, DCI that indicates a single precoder indication associated with non-codebook usage (block 810). For example, the base station (e.g., using controller/processor 240, transmit processor 220, TX MIMO processor 230, MOD 232, antenna 234, and/or the like) may transmit, to a UE, DCI that indicates a single precoder indication associated with non-codebook usage, as described above in connection with FIGS. 6A-6C.

As further shown in FIG. 8, in some aspects, process 800 may include receiving, from the UE, a single antenna-panel uplink transmission or a multiple antenna-panel uplink transmission based at least in part on whether the single precoder indication indicates the single antenna-panel uplink transmission or the multiple antenna-panel uplink transmission (block 820). For example, the base station (e.g., using antenna 234, DEMOD 232, MIMO detector 236, receive processor 238, controller/processor 240, and/or the like) may receive, from the UE, a single antenna-panel uplink transmission or a multiple antenna-panel uplink transmission based at least in part on whether the single precoder indication indicates the single antenna-panel uplink transmission or the multiple antenna-panel uplink transmission, as described above in connection with FIGS. 6A-6C.

Process 800 may include additional aspects, such as any single aspect or any combination of aspects described below and/or in connection with one or more other processes described elsewhere herein.

In a first aspect, process 800 includes transmitting a configuration for an SRS resource set, and the SRS resource set includes one or more first SRS resources configured with a first beam, and one more second SRS resources configured with a second beam.

In a second aspect, alone or in combination with the first aspect, process 800 includes transmitting configurations for a first SRS resource set and a second SRS resource set, the first SRS resource set includes one or more first SRS resources configured with a first beam, and the second SRS resource set includes one more second SRS resources configured with a second beam.

In a third aspect, alone or in combination with one or more of the first and second aspects, process 800 includes transmitting a configuration for an SRS resource, the SRS resource includes one or more first SRS ports configured with a first beam, and one more second SRS ports configured with a second beam.

In a fourth aspect, alone or in combination with one or more of the first through third aspects, the single precoder indication indicates multiple SRS resources or multiple SRS ports, and the multiple SRS resources or the multiple SRS ports are associated with respective precodings.

In a fifth aspect, alone or in combination with one or more of the first through fourth aspects, the single precoder indication indicates precoders that are to be indexed across multiple antenna panels.

In a sixth aspect, alone or in combination with one or more of the first through fifth aspects, the single precoder indication is in an SRI field of the DCI.

In a seventh aspect, alone or in combination with one or more of the first through sixth aspects, the single precoder indication indicates a first sub-precoder indication for a first antenna panel, and a second sub-precoder indication for a second antenna panel.

In an eighth aspect, alone or in combination with one or more of the first through seventh aspects, the single precoder indication indicates the single antenna-panel uplink transmission when the single precoder indication indicates one or more SRS resources or one or more SRS ports configured with a same beam.

In a ninth aspect, alone or in combination with one or more of the first through eighth aspects, the single precoder indication indicates the multiple antenna-panel uplink transmission when the single precoder indication indicates one or more first SRS resources, of an SRS resource set, configured with a first beam, and one more second SRS resources, of the SRS resource set, configured with a second beam.

In a tenth aspect, alone or in combination with one or more of the first through ninth aspects, the one or more first SRS resources are associated with a first antenna panel and one or more DMRS ports of a first CDM group, and the one or more second SRS resources are associated with a second antenna panel and one or more DMRS ports of a second CDM group.

In an eleventh aspect, alone or in combination with one or more of the first through tenth aspects, the single precoder indication indicates the multiple panel uplink transmission when the single precoder indication indicates one or more first SRS resources, of a first SRS resource set, configured with a first beam, and one more second SRS resources, of a second SRS resource set, configured with a second beam.

In a twelfth aspect, alone or in combination with one or more of the first through eleventh aspects, the one or more first SRS resources are associated with a first antenna panel and one or more DMRS ports of a first CDM group, and the one or more second SRS resources are associated with a second antenna panel and one or more DMRS ports of a second CDM group.

In a thirteenth aspect, alone or in combination with one or more of the first through twelfth aspects, the single precoder indication indicates the multiple panel uplink transmission when the single precoder indication indicates one or more first SRS ports, of an SRS resource, configured with a first beam, and one more second SRS ports, of the SRS resource, configured with a second beam.

In a fourteenth aspect, alone or in combination with one or more of the first through thirteenth aspects, the one or more first SRS ports are associated with a first antenna panel and one or more DMRS ports of a first CDM group, and the one or more second SRS ports are associated with a second antenna panel and one or more DMRS ports of a second CDM group.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving, from a base station, downlink control information (DCI) that indicates a single precoder indication associated with non-codebook usage; and
   transmitting, to the base station, a single antenna-panel uplink transmission or a multiple antenna-panel uplink transmission based at least in part on a determination of whether the single precoder indication indicates the single antenna-panel uplink transmission or the multiple antenna-panel uplink transmission.

2. The method of claim 1, further comprising:
   receiving a configuration for a sounding reference signal (SRS) resource set,
   wherein the SRS resource set includes one or more first SRS resources configured with a first beam, and one more second SRS resources configured with a second beam.

3. The method of claim 1, further comprising:
   receiving configurations for a first sounding reference signal (SRS) resource set and a second SRS resource set,
   wherein the first SRS resource set includes one or more first SRS resources configured with a first beam, and the second SRS resource set includes one more second SRS resources configured with a second beam.

4. The method of claim 1, further comprising:
   receiving a configuration for a sounding reference signal (SRS) resource,
   wherein the SRS resource includes one or more first SRS ports configured with a first beam, and one more second SRS ports configured with a second beam.

5. The method of claim 1, wherein the single precoder indication indicates multiple sounding reference signal (SRS) resources or multiple SRS ports, and the multiple SRS resources or the multiple SRS ports are associated with respective precodings.

6. The method of claim 1, wherein the single precoder indication indicates precoders that are to be indexed across multiple antenna panels.

7. The method of claim 1, wherein the single precoder indication is in a sounding reference signal resource indicator field of the DCI.

8. The method of claim 1, wherein the single precoder indication indicates a first sub-precoder indication for a first antenna panel, and a second sub-precoder indication for a second antenna panel.

9. The method of claim 1, wherein the single precoder indication is determined to indicate the single antenna-panel uplink transmission based at least in part on a determination that the single precoder indication indicates one or more sounding reference signal (SRS) resources or one or more SRS ports configured with a same beam.

10. The method of claim 1, wherein the single precoder indication is determined to indicate the multiple antenna-panel uplink transmission based at least in part on a determination that the single precoder indication indicates one or more first sounding reference signal (SRS) resources, of an SRS resource set, configured with a first beam, and one more second SRS resources, of the SRS resource set, configured with a second beam.

11. The method of claim 10, wherein the one or more first SRS resources are associated with a first antenna panel and one or more demodulation reference signal (DMRS) ports of a first code-division multiplexing (CDM) group, and the one or more second SRS resources are associated with a second antenna panel and one or more DMRS ports of a second CDM group.

12. The method of claim 1, wherein the single precoder indication is determined to indicate the multiple panel uplink transmission based at least in part on a determination that the single precoder indication indicates one or more first sounding reference signal (SRS) resources, of a first SRS resource set, configured with a first beam, and one more second SRS resources, of a second SRS resource set, configured with a second beam.

13. The method of claim 12, wherein the one or more first SRS resources are associated with a first antenna panel and one or more demodulation reference signal (DMRS) ports of a first code-division multiplexing (CDM) group, and the one or more second SRS resources are associated with a second antenna panel and one or more DMRS ports of a second CDM group.

14. The method of claim 1, wherein the single precoder indication is determined to indicate the multiple panel uplink transmission based at least in part on a determination that the single precoder indication indicates one or more first sounding reference signal (SRS) ports, of an SRS resource, configured with a first beam, and one more second SRS ports, of the SRS resource, configured with a second beam.

15. The method of claim 14, wherein the one or more first SRS ports are associated with a first antenna panel and one or more demodulation reference signal (DMRS) ports of a first code-division multiplexing (CDM) group, and the one or more second SRS ports are associated with a second antenna panel and one or more DMRS ports of a second CDM group.

16. A user equipment (UE) for wireless communication, comprising:
a memory; and
one or more processors operatively coupled to the memory, the memory and the one or more processors configured to:
receive, from a base station, downlink control information (DCI) that indicates a single precoder indication associated with non-codebook usage; and
transmit, to the base station, a single antenna-panel uplink transmission or a multiple antenna-panel uplink transmission based at least in part on a determination of whether the single precoder indication indicates the single antenna-panel uplink transmission or the multiple antenna-panel uplink transmission.

17. The UE of claim 16, wherein the one or more processors are further configured to:
receive a configuration for a sounding reference signal (SRS) resource set,
wherein the SRS resource set includes one or more first SRS resources configured with a first beam, and one more second SRS resources configured with a second beam.

18. The UE of claim 16, wherein the one or more processors are further configured to:
receive configurations for a first sounding reference signal (SRS) resource set and a second SRS resource set,
wherein the first SRS resource set includes one or more first SRS resources configured with a first beam, and the second SRS resource set includes one more second SRS resources configured with a second beam.

19. The UE of claim 16, wherein the one or more processors are further configured to:
receive a configuration for a sounding reference signal (SRS) resource,
wherein the SRS resource includes one or more first SRS ports configured with a first beam, and one more second SRS ports configured with a second beam.

20. The UE of claim 16, wherein the single precoder indication indicates multiple sounding reference signal (SRS) resources or multiple SRS ports, and the multiple SRS resources or the multiple SRS ports are associated with respective precodings.

21. The UE of claim 16, wherein the single precoder indication indicates precoders that are to be indexed across multiple antenna panels.

22. The UE of claim 16, wherein the single precoder indication is in a sounding reference signal resource indicator field of the DCI.

23. The UE of claim 16, wherein the single precoder indication indicates a first sub-precoder indication for a first antenna panel, and a second sub-precoder indication for a second antenna panel.

24. The UE of claim 16, wherein the single precoder indication is determined to indicate the single antenna-panel uplink transmission based at least in part on a determination that the single precoder indication indicates one or more sounding reference signal (SRS) resources or one or more SRS ports configured with a same beam.

25. The UE of claim 16, wherein the single precoder indication is determined to indicate the multiple antenna-panel uplink transmission based at least in part on a determination that the single precoder indication indicates one or more first sounding reference signal (SRS) resources, of an SRS resource set, configured with a first beam, and one more second SRS resources, of the SRS resource set, configured with a second beam.

26. The UE of claim 25, wherein the one or more first SRS resources are associated with a first antenna panel and one or more demodulation reference signal (DMRS) ports of a first code-division multiplexing (CDM) group, and the one or more second SRS resources are associated with a second antenna panel and one or more DMRS ports of a second CDM group.

27. The UE of claim 16, wherein the single precoder indication is determined to indicate the multiple panel uplink transmission based at least in part on a determination that the single precoder indication indicates one or more first sounding reference signal (SRS) resources, of a first SRS resource set, configured with a first beam, and one more second SRS resources, of a second SRS resource set, configured with a second beam.

28. The UE of claim 27, wherein the one or more first SRS resources are associated with a first antenna panel and one or more demodulation reference signal (DMRS) ports of a first code-division multiplexing (CDM) group, and the one or more second SRS resources are associated with a second antenna panel and one or more DMRS ports of a second CDM group.

29. The UE of claim 16, wherein the single precoder indication is determined to indicate the multiple panel uplink transmission based at least in part on a determination that the single precoder indication indicates one or more first sounding reference signal (SRS) ports, of an SRS resource, configured with a first beam, and one more second SRS ports, of the SRS resource, configured with a second beam.

30. The UE of claim 29, wherein the one or more first SRS ports are associated with a first antenna panel and one or more demodulation reference signal (DMRS) ports of a first code-division multiplexing (CDM) group, and the one or more second SRS ports are associated with a second antenna panel and one or more DMRS ports of a second CDM group.

* * * * *